Dec. 31, 1968   R. A. RAVICH   3,418,729
INTERPERSONAL BEHAVIOR GAME-TEST
Filed May 29, 1967   Sheet 1 of 3

INVENTOR.
ROBERT A. RAVICH
BY
OSTROLENK, FABER, GERB & SOFFEN
ATTORNEYS

FIG. 7

United States Patent Office

3,418,729
Patented Dec. 31, 1968

3,418,729
INTERPERSONAL BEHAVIOR GAME-TEST
Robert A. Ravich, 35 E. 85th St.,
New York, N.Y. 10028
Filed May 29, 1967, Ser. No. 642,061
17 Claims. (Cl. 35—22)

ABSTRACT OF THE DISCLOSURE

An interpersonal bargaining game-test including two substantially identical layouts upon which electrically operated vehicles, such as model trains, have a choice of traveling a direct route from start to finish and an alternate route, significantly longer than the direct route. The direct route of each layout is so spaced that extending members of the two model vehicles will engage one another, or a common conductive member, or corresponding electrically connected conductive members to cause the vehicles to stop when both vehicles are traveling their direct routes thereby simulating a collision. By recording the responses of the participants, qualified personnel are able to determine the participants' aptitude in a bargaining situation.

---

This invention relates to psychological testing apparatus, and more particularly relates to an interpersonal bargaining game-test, with the help of which qualified personnel are capable of determining the influence of various threat conditions upon a typical bargaining situation.

In an article entitled, "The Effect of Threat Upon Interpersonal Bargaining," by Morton Deutsch and Robert M. Krauss, Journal of Abnormal and Social Psychology, 1960, vol. 61, No. 2, pages 181–189, there is described a two-person bargaining game wherein the two subjects are asked to believe that they each manage a trucking company attempting to make profit by reducing the time of travel from a starting to finishing point. Each participant has an option of choosing between a direct route, and a longer alternate route, with the direct routes of each trucker being shared in common. Thus, both participants cannot travel the direct route simultaneously.

Each participant in the Deutsch and Krauss experiment is provided with a map of his trucking course and a control board which includes a reversible counter. At the start of the experiment a participant starts the counter stepping forward by moving a control switch toward a forward designation, and the participant is asked to compare the number on his counter with numbered stations along his map and imagine that he is traveling along either the alternate or direct route. Similarly, when the participant moves his control switch to reverse, the counter is stepped backward and the participant is again asked to imagine that his truck is moving backward along the numbered stations on his map. If both participants have chosen the direct route, the counters of the respective participants are so arranged that they will stop and thereby simulate a collision at the point in time when both imaginary trucks would have reached the common direct route.

Additionally, the Deutsch and Krauss article explains that the basic apparatus may be supplemented by the addition of two gates, one under the control of each participant, with the gates so arranged that either participant may prevent the other participant from traveling along the direct route. In reality, election of the "gate closed" condition by either participant would stop the counter of the other participant in the event that he had chosen the direct route.

With no gates, the Deutsch and Krauss experiment amounts to a no-threat bargaining situation (when both participants are confronted with a potential collision situation), whereas with the addition of the gates, a threat condition can be added to the bargaining situation.

Although the above described Deutsch and Krauss experiment is founded upon sound psychological principles, the physical apparatus for implementing the bargaining situation has many drawbacks which the instant invention overcomes. Specifically, it may be appreciated that in asking the participants to imagine his vehicle traveling along the numbered map which is before him, the participants are detached from a real life physical situation in which their bargaining prowess can be utilized. Similarly, the success or failure of the experiment depends to a great extent upon the sophistication of the participants in being able to correlate the numerical value of his counter with the numbered stations along his map. If either of the participants cannot understand the relatively complex instructions which are necessary to teach the correlation between his counter and the map, the experiment must fail.

In contradistinction to the apparatus utilized in the Deutsch and Krauss experiment, the instant invention presents a real, physical mock-up within which the participants can experience an actual collision situation which will thereby require to the fullest extent, the bargaining capabilities of the individuals involved. Accordingly, the recorded results of the participants' actions in the collision situation, to be explained in greater detail, will present the most accurate data upon which psychological analysis by skilled personnel may be based. Similarly, by the utilization of a physical mock-up of the collision situation which gives rise to the bargaining process, the instant invention eliminates all those problems in the prior art which stem from the basic requirements that the participants must imagine the travel of their respective vehicles and continually correlate the number on their counter with numbered stations along a map.

More specifically, the instant invention basically comprises a pair of layouts, or courses, upon which travel a pair of electrically operated vehicles, such as model trains or model trucks, each under the operation and control of one of the participants of the experiment. Each course includes a start and finish position, between which each of the participants may travel one of two routes. The first route of each layout is a relatively short direct route which, if travel is unimpeded, will provide a minimum lapsed time from start to finish. Alternatively, each of the participants may choose an alternate route on their respective layouts which is significantly longer than the direct route and would correspondingly produce a longer lapsed period from start to finish. Since the participants are asked to imagine that they are running a railroad line in which profits are dependent upon the time it takes to complete their trip, it would be logical that both participants would prefer the direct route over their alternate route.

However, and in accordance with the instant invention, collision simulation means cooperate with each of the vehicles to stop the forward movement thereof in the event both participants have chosen the direct route. In the collision simulation, either participant may reverse his vehicle but in no event can the vehicles pass one another along their respective direct routes. By recording the actions of the participants in the collision situation, i.e., their oral communication to one another, the time required to complete each trip, the number of reverses, etc., the experimenter is able to analyze the participants' patterns of interaction, if any, in a real life bargaining situation where he has been confronted with the threat and/or objectives of another competitor.

In a preferred embodiment of the instant invention, the collision simulation means comprises an extending arm carried by each of the vehicles such that when both vehicles are traveling along their direct route, the extending arms will physically contact one another to establish a circuit which will prevent the application of forward-motion-producing current to the respective vehicles. With this current no longer flowing to the vehicles, forward motion is halted.

In an alternative embodiment of the instant invention the collision simulation means includes a plurality of insulatingly spaced conductive members disposed between the direct routes of the two layouts. In this embodiment, as in the above described embodiment, the two vehicles carry extending conducting members. However, in this embodiment, when the two vehicles approach a collision situation (i.e., they would collide if they were on the same track), the extending conductive members of the two vehicles engage a common conductive strip to establish the circuit which prevents the application of forward-motion-producing current flow to the vehicles.

In still another preferred embodiment of the instant invention it is possible that the two layouts be physically remote from one another. In this embodiment when the two vehicles approach what would correspond to a collision location, the extending conductive members of each would contact corresponding ones of electrically connected conductive members to thereby establish the circuit which diverts forward-motion-producing current from the vehicles.

It will be appreciated, and it is to be considered a particularly advantageous feature of the instant invention, that many embodiments are possible for carrying out the basic concept of causing the two vehicles to stop, and thereby simulate a collision, when both participants have caused their vehicles to travel their direct routes.

Accordingly, it is an object of the instant invention to provide an interpersonal psychological bargaining game-test with the aid of which qualified personnel can determine the participants' reactions and aptitudes when confronted with a bargaining situation.

It is another object of the instant invention to provide an interpersonal psychological bargaining game-test which is capable of recording participants' actions in a no-threat, unilateral threat, and bilateral threat situation.

It is another object of the instant invention to provide an interpersonal psychological bargaining game-test which physically simulates the collision of conflicting interests to thereby test a participant's reactions in an actual bargaining environment.

Still another object of the instant invention is to provide an interpersonal psychological bargaining game-test which represents a marked advancement over the prior art in that it presents a real-life conflict within which the bargaining capabilities of the participants can be measured while at the same time, and necessarily, minimizes the extent to which the participants' imagination or intelligence level can influence the outcome.

Still another object of the instant invention is to provide an interpersonal psychological bargaining game-test in which various embodiments are possible to realistically simulate a collision situation within the realm of which the participants' aptitudes for bargaining can be measured.

Other objects and a fuller understanding of the instant invention may be had by referring to the following description and drawings, in which.

Figure 1:
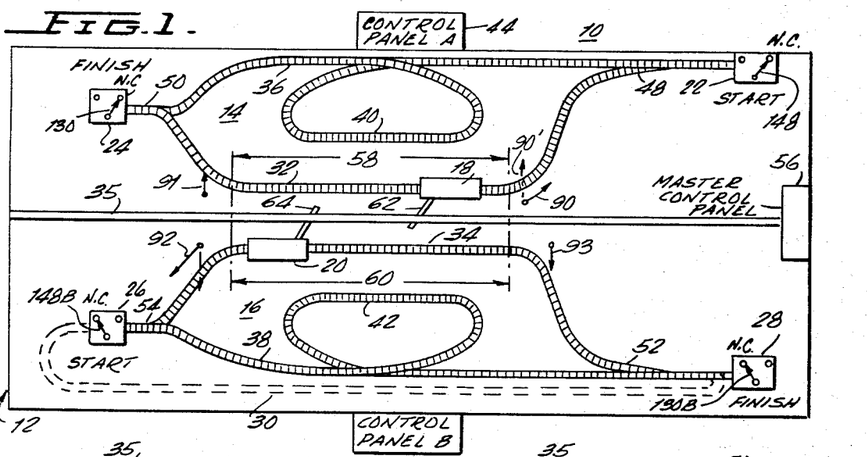
FIGURE 1 is a schematic plan view of the interpersonal bargaining game-test of the instant invention.

Referring more specifically to FIGURE 1, there is schematically shown the interpersonal bargaining game-test 10 of the instant invention. The bargaining game 10 includes a platform or other suitable surface 12 upon which is situated two courses or layouts 14 and 16, respectively, upon which model vehicles 18 and 20, such as toy trains, are electrically operable between start and finish positions 22, 24 and 26, 28, respectively. For ease of identification throughout the rest of this description, course 14 will be designated as operable under the direction of a participant A, while course 16 will be designated as operable under the direction of a participant B. A partition 35 is disposed between the layouts 14 and 16 such that neither participant will be able to see the movement of the other participant's vehicle.

It will be appreciated that the instant invention is illustrated as having distinct starting and finishing positions for each layout. However, if desired, the starting positions such as 22 and 26 could also function as the finishing positions in which case there would be required additional segments of track on each layout from the points now designated the finishing position such as 24 and 28 back to the starting positions such as now designated 22 and 26. The phantom segment of track 30, shown on layout 16, illustrates this type of embodiment wherein the starting position such as 26 might also function as the finishing position. As will be explained in greater detail, in the bargaining game 10 shown in solid line in FIGURE 1, each of the vehicles such as 18 and 20 must be reversed from its finishing position back to its starting position after a run has been completed.

Each of the layouts or courses 14 and 16 includes what may be designated a first or direct route 32 and 34, respectively, which represents for the participants A and B the shortest distance which the vehicles 18 and 20 may traverse between their starting and finishing positions. Also provided on each course is an alternate route designated 36 and 38, respectively, which, because of the looped segments 40 and 42, is significantly longer than the direct routes 34 and 36.

As will be explained in greater detail, by the operation of a single pushbutton on his respective control panel 44, 46, each participant may operate the switches 48, 50 and 52, 54, respectively, to select the route which his vehicle will travel. Similarly, and as will be explained in greater detail, a master control panel 56 is provided by which the experimenter may record the actions of the participants A and B.

Assuming that both vehicles 18 and 20 are at their starting position 22 and 26, respectively, and further assuming that both participants have chosen the alternate routes 36 and 38, it will be apparent that both vehicles 18 and 20 will travel unimpeded between their starting and finishing positions and should reach their destinations in approximately the same amount of time. Assuming, however, that one participant, say participant A, has chosen the direct route 32 while participant B has chosen the alternate route 38, it will be equally apparent that both vehicles will travel unimpeded between their starting and finishing positions, but that participant A's vehicle 18 will reach its finish position 24 prior to the time that the vehicle 20 reaches its finish position 28. Since both participants are initially told that they are managing a railroad company and that their profits will depend upon the amount of time it takes them to complete their trips, it is logical that both participants would select their direct routes 32 and 34.

However, and in further accordance with the instant invention, the direct routes 32 and 34 of the two courses are so arranged that if vehicles 18 and 20 are both travelling their direct routes 32, 34 at the same time, a collision simulation location will be reached, the exact point of which will vary within the segments 58, 60, dependent upon the time of arrival of the vehicles 18 and 20 within the segments. Thus, in the embodiment shown in FIG. 1, each vehicle carries a conductive arm 62 and 64, respectively, which travel within an elongated slot 66 in partition 35 (see FIG. 2), when the vehicles have entered the segments 58 and 60. As the vehicles approach one another on their parallel segments, the conductive arms 62 and 64 will engage one another such that, and in a manner to be further described, the forward-motion-producing energizing current to each vehicle will be diverted therefrom, causing both vehicles to stop, thereby simulating a collision. So far as the participants A and B are concerned, the collision simulation means described above is the equivalent of having a single common direct route for both participants, through which only one vehicle can pass at one time.

As will be explained in greater detail, once a collison has occurred, either participant can cause his vehicle to reverse, but in no event can the vehicles 18 and 20 pass one another when they are both on the segments 58 and 60. It will be further appreciated that the collison need not take place at the exact center of the segments 58 and 60, for if one of the participants had momentarily delayed his vehicle at the beginning of the experiment, the collision would have occurred closer to that person's starting point but within the predetermined segments 58, 60.

As pointed out above, once a collision has occurred, either participant has several alternatives available to him. For example, the participant A might reverse his vehicle 18 until it backs out of the segment 58. He could then wait for vehicle 20 to exit the segment 60, and then go forward again to complete his travel to the finishing point 24. Alternatively, the participant, such as A, could reverse his vehicle 18 all the way back to the starting point 22, and then by means of a selection route button on his control panel 44, change the switches 48 and 50 such that he could travel unimpeded on his alternate route 36. However, it will be appreciated that in reversing and taking the alternate route, the participant A would require an excessively long trip to reduce his imaginary profits accordingly. As a final choice, it will be appreciated that participant A could stand fast on his segment 58 and hope that the participant B reverses his vehicle 20 out of the segment 60.

It may be appreciated that the above described apparatus presents a real life situation in which the conflicting interests (the profit motive) of both participants are pitted against one another. It is within this environment that the experimenter, by the utilization of his master control panel 56, as will be further explained, can record the actions of the participants to analyze the bargaining prowess of each participant.

Figure 2:
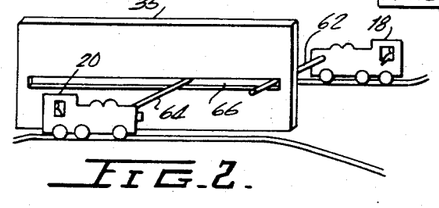
FIGURE 2 is a schematic representation of a portion of FIGURE 1.
Figure 3:
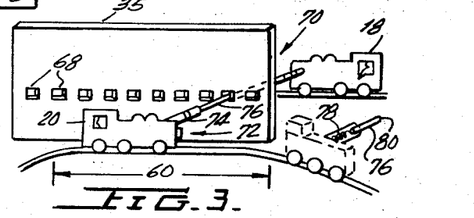
FIGURE 3 is a schematic representation of an alternative embodiment of a portion of FIGURE 1.

FIGS. 3 and 4 schematically illustrate alternative embodiments of the collision simulation means necessary in the practice of the instant invention. Thus, in FIG. 3, the elongated opening 66 of FIG. 2 is replaced by a plurality of insulatingly spaced conductive strips 68. Additionally, each vehicle carries a current-carrying assembly 70 and 72, respectively, which includes a first tubular conductive member 74 witin which is spring-biased a second tubular conductive member 76. It will be appreciated that when the vehicles are anywhere on their layouts except the segment 58, 60, the spring 78 will bias the smaller tubular member 76 to an extended position; whereas when the vehicles enter the segments 58, 60, such that the outer extremities 80 engage the conductive strips 68, they will be urged against the bias of spring 78 into the larger conductive members 74. It will be further appreciated that when both smaller conductive tubular members 76 engage a common conductive strip 68 (a simulated collision), the same electrical result is achieved as when the arms 62 and 64, of FIGS. 1 and 2, become physically engaged.

Figure 4:
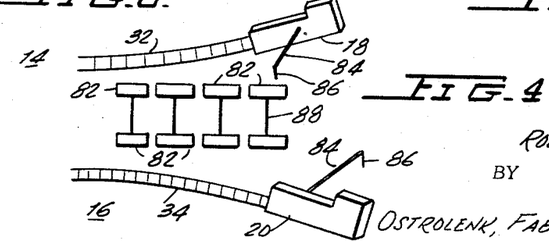
FIGURE 4 is a schematic representation of yet another embodiment of a portion of FIGURE 1.

FIG. 4 represents an alternative embodiment of the embodiment of FIG. 3, except that in FIG. 4, the conductive strips 68 have been replaced with pairs of electrically connected conductive members 82. Additionally, each of the vehicles 18 and 20 includes a laterally extending current-carrying member 84 having a downwardly projecting section 86 which engages the surface of the strips 82 as the vehicles 18 and 20 approach the collison situation. It will be apparent that when both vehicles have entered their segments, such as 58 and 60 in FIG. 1, at approximately the same time, the downwardly projecting portions 86 and 88 will be electrically connected through the conductive members 82 and the intermediate wiring 88 which, as will be explained in greater detail, will divert forward-portion producing current flow from the vehicles to cause the vehicles to stop, thereby simulating the collision situation. FIG. 4, in addition to illustrating the possibility of remotely locating the layouts 14 and 16 from one another by extending the length of the conductors 88, also illustrates an embodiment in which the vehicles such as 18 and 20 travel in the same direction along their respective direct routes 32 and 34.

*Gates*

It may be noted that the apparatus thus far described in FIGS. 1–4 represents a "no-threat" bargaining situation. That is, neither participant has any advantage over the other, and neither participant has any particular tactic which he might utilize to intimidate the other party into restraining from selecting his direct route. In accordance with the instant invention, the basic apparatus thus far described in FIG. 1 may be supplemented by the addition of a gate 90 on layout 14 under the control of participant B as follows.

If participant B wishes to prevent participant A from traveling on the direct route 32, the participant B would depress the gate "closed" button 286 on his control panel 46. Under this direction, the gate 90, if in its open, solid-line position of FIG. 1, would rotate to its dotted line position 90', to prevent vehicle 18 from entering the segment 58 (thereby preventing a collision from occurring). If participant B had chosen to depress the open gate pushbutton 284, the gate 90 would rotate to its solid line position shown in FIGURE 1 and allow the vehicle 18 to enter the segment 58. It will be apparent with the addition of gate 90, operable under the control of participant B, the apparatus of FIGURE 1 becomes a unilateral threat bargaining apparatus, in the sense that participant B has an ultimate weapon which he can utilize to intimidate participant A from selecting the direct route.

Similarly, by adding a gate 92 on B's layout 16, under the control of participant A, participant A can prevent participant B from traveling along the segment 60. In this situation, the apparatus of FIGURE 1 functions as a bilateral threat bargaining apparatus, since both participants have a weapon which, if they choose, they can utilize to intimidate the other participant's actions. As will be shown, the experimenter's control panel 56 has means for monitoring and recording the participant's use of the gates 90 and 92.

As illustrated at 91 and 93, it is possible to locate the gates at the end of the respective segments 58 and 60 in which case a collision simulation could still occur while at the same time either participant could still prevent the other from completing his trip on the direct route.

Having broadly described the overall operation of the apparatus of FIGURE 1, a more detailed description of a preferred method of implementing the invention will now be presented with specific reference to FIGURES 5, 6, 7 and 8.

Figure 6:
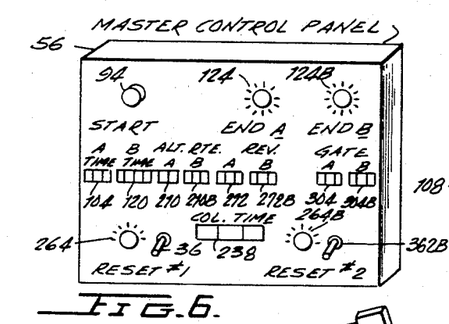
FIGURE 6 is a plan view of the master control panel utilized in the bargaining game-test of FIGURE 1.
Figure 7:
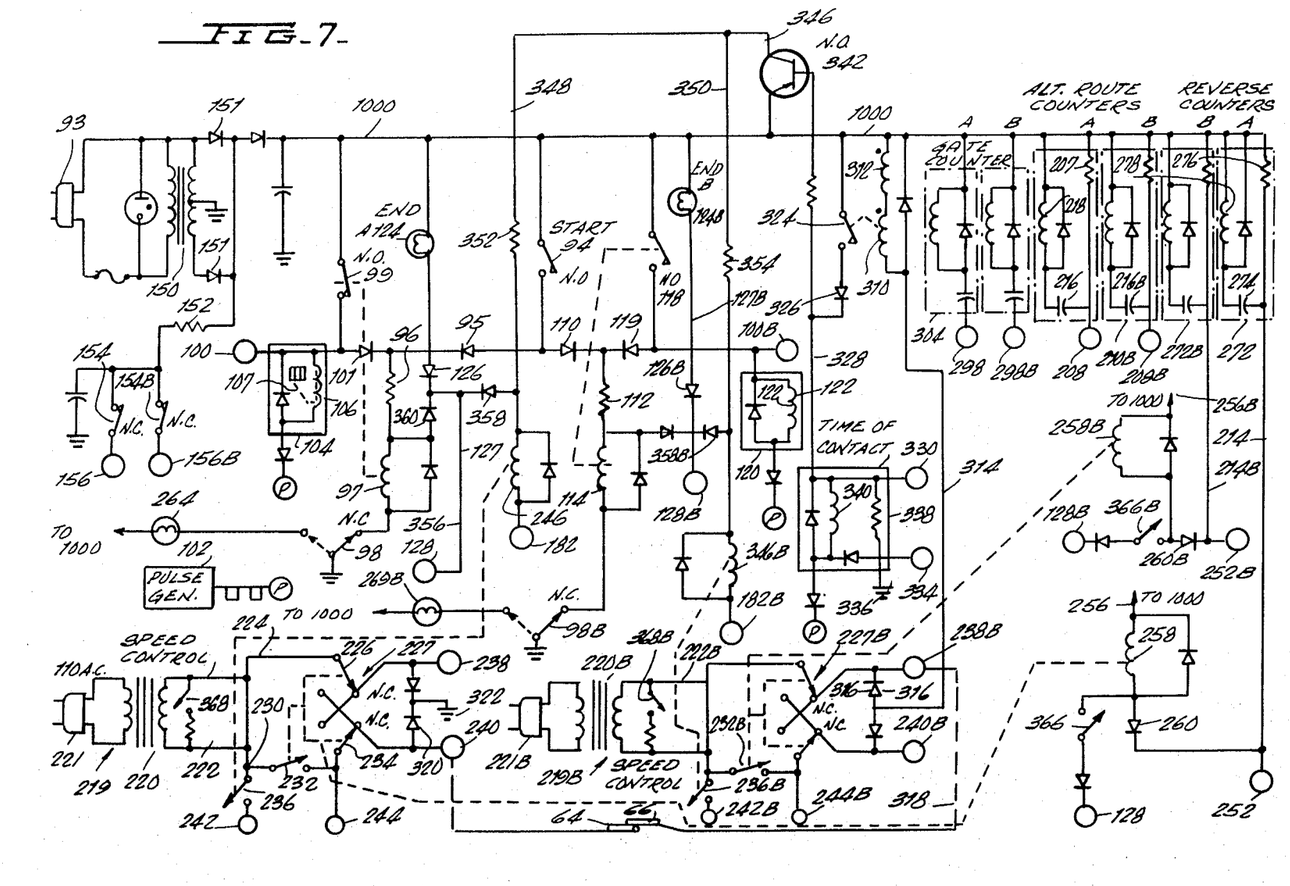
FIGURE 7 is a schematic circuit diagram of the master control panel of FIGURE 6, and peripheral equipment.

Intially, the experimenter depresses the "start" pushbutton 94 on the master control panel 56 of FIGURE 6, which is also shown schematically in FIGURE 7. The closing of normally open pushbutton 94 momentarily establishes a circuit path from the AC source 93, through the step-down transformer 150, rectifying diodes 151, common conductor 1000, to the contact 94, diode 95, resistor 96, relay coil 97 and the normally closed reset switch 98 to ground. Upon the energization of relay coil 97, its normally open contact 99 is closed, such that even after the start pushbutton 94 is released, a lock-in circuit is now permanently established through the now closed contact 99, diode 101, resistor 96, the relay coil 97 and the reset switch 98. In parallel with this circuit path, current flows to the terminal 100 which is the input to the first participant's (say participant A) control panel 44 (see FIGURE 8). Simulatneously, with the flow of current to the terminal 100 in FIGURE 7, a negative pulse generator 102 of conventional design applies pulses P to a coil 106 of a running time counter 104, which provides a visual indication on the master control panel 56 (see FIGURE 6) of the total elapsed time that power is being provided to the control panel 44 of participant A. As is well understood by those skilled in the art, a mechanical coupling advances the counter 104 with each pulse applied to coil 106. This is schematically illustrated at 107 in FIGURE 7. It will be seen that when terminal 100 of FIGURE 8 is supplied with power, a start light 108 is energized in participant A's control panel 44 to provide a visual indication to participant A that his layout is energized.

Simultaneously, with the depression of the normally open pushbutton 94 by the experimenter, a second circuit path is established through diode 110, resistor 112, relay 114 and the normally closed reset switch 98B to ground. Upon the energization of relay 114, its normally open contact 118 is closed to establish a permanent lock-in circuit for relay 114 through now closed contact 118, diode 119, resistor 112, and the normally closed reset switch 98B. In parallel therewith, current flows to the terminal designated 100B, which represents the input to participant B's control panel 46. Since B's control panel 46 is identical to A's control panel 44, only one panel will be shown in FIGURE 5, and similarly only one circuit diagram will be presented in FIGURE 8. However, when B's control panel 46 is being referred to the designation B will follow the reference character. It will be understood that the application of potential to terminal 100B will energize a start light 108B on B's control panel, and similarly the pulse generator 102 will provide negative pulses to a running time counter 104B which, as was the case for the counter 104, will provide the experimenter's control panel 56 with a visual indication of the total elapsed time from the moment B's control panel is energized until completion of the trip.

It will be seen in FIG. 6 that the master control panel 56 includes two lights 124 and 124B which, when energized, indicate to the experimenter that participants A and/or B have completed their trips from start to finish. Referring to FIG. 7, it will be seen that "end A" light 124 is in a circuit including diode 126, conductor 127 and terminal 128, which as shown in FIG. 8, terminates in an open circuit because of the normally closed condition of a forward limit microswitch 130 which, as shown in FIG. 1, is located at the finish position 24 and will only be physically moved to its normally open condition when the vehicle 18 reaches the finishing point 24. Assuming for a moment that the vehicle 18 does reach the finish position 24 and moves contact 130 from its normally closed to its normally open position, then the terminal 128 in FIG. 8 will be grounded at 132 to energize the "end A" light 124 on the master control panel 56. Similarly, the "end B" light 124B is in series circuit with the diode 126B, conductor 127B, and a terminal designated 128B, which corresponds to the terminal 128 shown in FIG. 8. Thus, when the vehicle 20 reaches its finishing position 28 to physically move the contact 130B from its normally closed to its normally open condition, a circuit path through the "end B" light 124B will be completed to ground and energized on the control panel 56 to provide an indication that the participant B has completed his trip.

Figure 8:
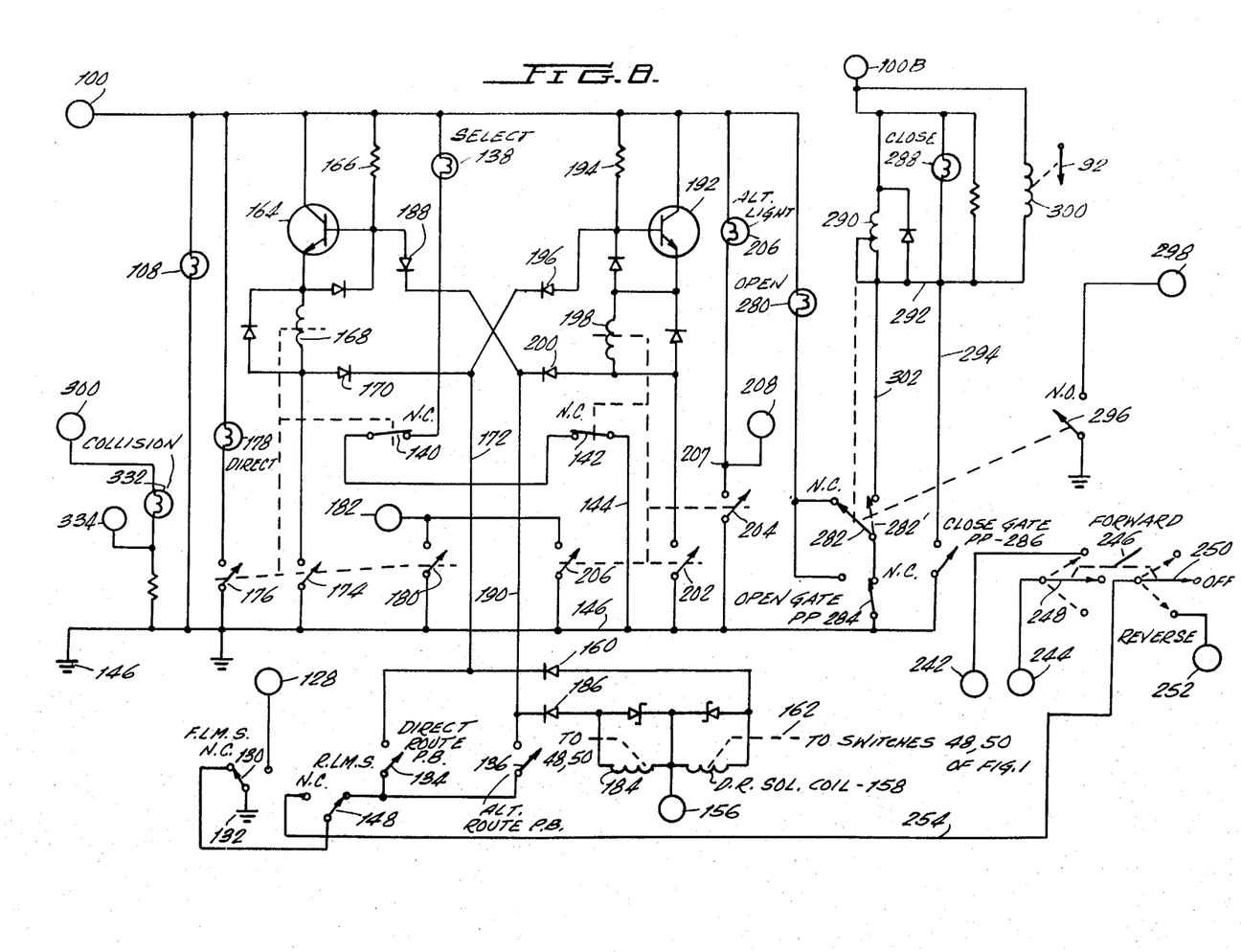
FIGURE 8 is a schematic circuit diagram of the participant's control panel of FIGURE 5 and peripheral equipment, it being understood that duplicate circuitry of FIGURE 8 would be required for the second participant.

It may be pointed out that there is also a rear limit microswitch 148 (148B) at the starting positions 22 and 26, respectively (see also FIG. 8). These microswitches are normally closed, but maintained open by the physical presence of the vehicles 18 and 20 whenever they are situated at their starting positions.

Returning to the initiation of the equipment, with both participants' control panels 44 and 46 energized, each participant begins by selecting the route which his vehicle will travel. Initially, there is a current path in FIG. 8 from the terminal 100, through the select route light 138, normally closed contact 140, normally closed contact 142, and conductor 144 to a common ground 146. Thus, the select route light 138 on the control panel 44 (and B's control panel 46) is initially energized to inform the participants that they may choose their route. The participant chooses his route by depressing either the direct route pushbutton 134 or the alternate route pushbutton 136 (134B or 136B) on his control panel 44 or 46, respectively. Such pushbuttons are also shown schematically in FIG. 8. It should be pointed out, and as will be explained in greater detail, by means of a novel interlock arrangement, the participants must select their routes before they can move their vehicles forward.

Assuming that participant A has depressed the direct route pushbutton 134, and appreciating that the rear limit microswitch 148 is in its open condition because of the physical pressure of vehicle 18 at its starting position 22, current flows from the step-down transformer 150 of the master control panel 56 (see FIG. 7), through rectifying diodes 151, resistor 152, normally closed reset switch 154, to terminal 156 (terminal point 156 is also shown on FIG. 8), through a direct route solenoid coil 158, diode 160, through the now closed direct route pushbutton 134, the now open rear limit microswitch 148, the normally closed forward limit microswitch 130, and to ground 132. As schematically shown at 162, direct route solenoid 158 is mechanically coupled to the switches 48 and 50 of FIG. 1 such that these switches will now be set to direct the vehicle 18 along the direct route 32. If "B" had chosen the direct route, an identical operation would take place, with current from the step-down transformer 150 flowing through the normally closed reset switch 154B and the terminal point 156B of FIG. 7.

Simultaneously with the depression of the direct route pushbutton 134, a momentary circuit path is completed in FIG. 8 from the terminal 100, transistor 164 (normally biased on by the resistor 166), relay coil 168, diode 170, conductor 172, momentarily closed pushbutton 134, the now open rear limit microswitch 148 (the vehicle 18 is still at its starting position 22 in FIG. 1) and the normally closed forward limit microswitch 130 to ground 132. The momentary energization of relay 168 accomplishes four functions. First, it closes normally open contact 174 to lock in the coil 168. Secondly, it closes normally open contact 176 to energize the direct route light 178 on the control panel 44 to provide a visual indication to the participant A that he has chosen the direct route. Third, it opens normally closed contact 140 to interrupt the flow of current to the select route light 138 and fourth, closes the normally open contact 180 to provide a ground path from the terminal point 182 which, as will be further explained, is part of the aforementioned interlock and finally allows the participant to move his vehicle forward.

Assuming the participant had chosen the alternate, by depressing the alternate route pushbutton 136, circuit operation would have been as follows. Current would flow from the stepdown transformer 150 of FIG. 7 through the normally closed reset switch 154, to terminal point 156 (now to FIG. 8), through the alternate route solenoid coil 184, diode 186, momentarily closed pushbutton 136, now open rear limit microswitch 148, normally closed forward limit microswitch 130, and to ground 132. Energization of the alternate route solenoid coil 184 would change the switches 48 and 50 of FIG. 1, such that the vehicle would travel the alternate route 36. Simultaneously, transistor 164 would be shorted out by the diode 188, conductor 190 and through the momentarily depressed pushbutton 136 to ground 132, to deenergize relay 168 and allow contacts 140, 174, 176 and 180 to reset. However, transistor 192 would remain biased by resistor 194 because of the open circuit path through diode 196 which terminates at the open pushbutton 134. (Similarly, in the situation where the participant A had selected the direct route, the transistor 164 would remain "on" despite the presence of the diode 188, because of the open circuit at the alternate route pushbutton 136 and the transistor 192 would be turned off.)

Simultaneously, a momentary circuit would be completed through the transistor 192, relay coil 198, diode 200, conductor 190 and on to ground through the momentarily depressed pushbutton 136. Energization of the relay 198 performs four operations. First, it closes normally open contact 202 to lock in the relay 198. Second, it closes the normally open contact 204 to energize the alternate route light 206 on the control panel 44 (see FIG. 5). Third, it opens normally closed contact 142 to deenergize the select route light 138, and fourth, it closes the normally open contact 206 to establish a ground for the terminal point 182.

It will be appreciated that the selection of the direct route or alternate route by participant B is exactly the same as was described for participant A.

Furthermore, it will be appreciated that so long as the vehicle, such as 18 or 20, remains at its starting position (22 and 26, respectively, in FIG. 1), such that the rear limit microswitch 148 remains in its open position, either participant can change his route simply by depressing the other route button. Thus, assuming that the participant A had initially chosen the alternate route, he would simply depress pushbutton 134 which would short out the base of transistor 192 (through the diode 196), thereby deenergizing relay 198 to open contacts 202, 204, 206 and close contact 142, while at the same time allowing the biased transistor 164 to energize relay 168 which in turn would close contacts 174, 176 and 180 and open contact 140. Simultaneously the direct route solenoid coil 158 would be energized by the transformer 150, as explained previously, via the circuit path including diode 160 and the momentarily closed direct route pushbutton 134 to set the switches 48 and 50 of FIG. 1 for the direct route 32. Similarly, it will now be appreciated that once the vehicle has left the start position, in a manner to be described below, the only way he can change his route is to reverse his engine all the way back to its respective starting position, such as 22 in FIG. 1, whereby the rear limit microswitch 148 can be moved back to its open condition, a prerequisite to the selection of a route.

To summarize the operation of the route selection circuitry, it may be said that a three-state flip-flop is provided by the two transistors 164 and 192, in combination with the base shorting circuits (diode 188 and 196), with the alternate and direct route pushbutton 134 and 136. Thus, with both pushbuttons open, both transistors 164 and 192 are biased on by the resistors 166 and 194, respectively, but the relays 168 and 198 are deenergized. This represents the first state of the three-state flip-flop. When one pushbutton, say 134, is closed, one transistor 192 is turned off while the other transistor 164 is connected in circuit with the appropriate relay 168. This is the second-state. Finally, if the other pushbutton is depressed, transistor 164 is turned off by the shorting diode 188 while the other transistor 192 is connected in series with the appropriate relay 198. This represents the third-state.

Finally, to provide the experimenter with a record of the number of times a participant has chosen the alternate route, a parallel circuit is established from the common conductor 1000 of FIG. 7, through an alternative route counter 210 (see also FIG. 6), to the terminal 208 (now to FIG. 8) and to ground 146 through the now closed contact 204. It will be appreciated that the current flow through the resistor 207 of counter 210 charges capacitor 216 which in turn discharges across coil 218 to advance the dial on the master control panel 56 for each use of the alternate route pushbutton 136.

Although not shown in the drawings, if desired, a direct route counter could be provided such that the experimenter could record the number of times participants have chosen the direct route.

*Vehicle control*

Referring to FIG. 7, there are shown two control apparatus broadly designated 219 and 219B for controlling the movement of the vehicles. Each control apparatus includes an AC source 221, a step-down transformer 220, a conventional speed control unit 222, a normally closed two-pole switch 227 including contacts 226 and 234, and two terminals 238 and 240, which are connected to the track of the participants' layout for energization of the vehicles. The speed control 220 is a simple rheostatic device by which the speed of the vehicles may be preset and maintained at all times. Interposed between the output terminal 230 of the speed control 222 and the contact 234 is a normally open contact 232, and interposed between terminal 230 at a terminal 242 is a normally open contact 236.

Normally open contact 236 provides the interlock feature mentioned previously by which a participant may not begin his trip until he has selected a route. Specifically, it will be recalled, in referring to FIG. 8, that a terminal point 182 was not grounded until the normally open contact 180 or the normally open contact 206 had been closed in response to a participant's selection of a route. Referring back to FIG. 7, it will be seen that a relay 246 cannot be energized by a normally ON transistor 342, unless the point 182 is connected to ground. When energized, relay 246 closes the normally open contact 236 of the control apparatus 219 which, as will be further explained, primes the apparatus for forward motion. Accordingly, it is not until a participant has selected his route, such that the terminal point 182 can be grounded, is it possible for the relay 246 to close the contact 236. Similarly, a relay 246B cannot be energized by transistor 342 (via conductor 350 and resistor 354), until the terminal point 182B is grounded. Therefore, the normally open contact 236B in the control apparatus 227B will not be closed until the participant B has chosen his route.

Figure 5:
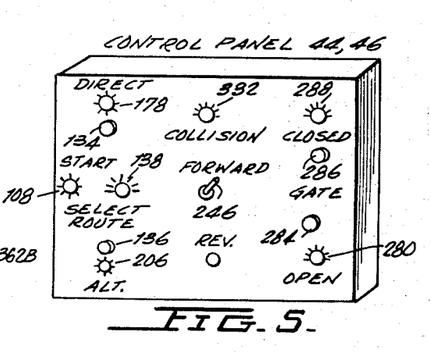
FIGURE 5 is a plan view of one of the participant's control panel utilized in the interpersonal bargaining game-test of FIGURE 1, the other participant's control panel being identical.

Assuming that the participants have chosen their routes, such that the normally open contacts 236 and 236B of FIG. 7 are closed, the participants may start their vehicles moving forward by moving their forward-reverse switch 246 (and 246B), shown in the circuit diagram of FIG. 8 and also on the control panel of FIG. 5, toward the forward designation. As can be seen in FIG. 8, the forward reverse switch 246 is a two-pole switch, including contacts 248 and 250, both movable in response to movement of the switch 246. When the participant moves switch 246 to the forward designation, the contact 248 completes a circuit path from terminals 242 to 244 which, as will be seen on the control apparatus 219 of FIG. 7, completes a circuit path from terminal 230 of the speed control unit 222, through the now closed contact 236, terminal 242, contact 248, terminal 244, normally closed contact 234 and on to the track terminal 240. (Normally closed contact 226 completes the circuit to terminal 238.)

Once the vehicle is travelling, the participant can reverse his vehicle by moving the forward reverse switch 246 toward the reverse designation. This will cause the contact 250 of FIG. 8 to complete a circuit path from terminal 252 through contact 250, conductor 254, now closed rear limit microswitch 148 (because the vehicle has left the starting point 22), and normally closed forward limit microswitch 130 to ground 132. With terminal 252 grounded, and referring to FIG. 7, there is a current path established from common conductor 1000 at point 256 through a reversing coil 258, diode 260 and on to ground through terminal 252. Energization of the reversing coil 258 causes the following action in the control apparatus 219. First, contacts 226 and 234 are moved from their N.C. to their open position while simultaneously the normally open contact 232 is closed to establish a current path from the terminal 230 to the contact 234 (since there is no longer a short circuit existing between points 242 and 244 because of the new position of the contact 248 in FIG. 8). Because of the criss-cross wiring associated with the two-pole switch 227, when the contacts 226 and 234 change their positions, opposite polarity is applied to the terminals 238 and 240 to reverse motion of the vehicle 18.

Additionally, when current flows from the common conductor 1000 (point 256) through the reversing coil 258, diode 260 and on to ground through terminal 252, a parallel branch circuit is established from common conductor 1000 through the "A" reverse counter 272 and conductor 214 to provide a visual indication on the master control panel 56 of FIG. 6, of the number of times the participant A has reversed his vehicles.

It may be appreciated that current applied to the reverse counter 272 charges a capacitor 274, in parallel with conductor 214, which discharges across coil 278 to advance the dial of reverse counter 272 on the master control panel 56 (see FIG. 6) each time the participant reverses. Similarly, when participant B moves his forward-reverse switch 246 to the reverse designation, reversing coil 258B of FIG. 7 is grounded through the diode 260B and terminal 252B to close contact 232B and move contacts 226B and 234B, whereby current of reversed polarity can be applied to terminal 238B and 240B. Also, a parallel branch is established from conductor 1000B to the "B" reverse counter 272B, and on to ground through terminal 252B and the microswitches 148B and 130B.

It may be further appreciated that initially, with the vehicles in their starting positions such as 22 and 26, respectively, of FIG. 1, the operator cannot and should not be able to reverse vehicle. This is necessarily so since, when the vehicles are in their starting position, the rear limit microswitch 148, shown in FIG. 8, for each participant will remain in its open condition, such that there can never be a ground path established for the reversing coils 258 (or 258B).

*Gates*

Having explained how each participant may move his vehicle, before proceeding with the possible consequences, it is useful to explain how the participants may utilize their respective gates 90 and 92 of FIG. 1 to prevent the other participant's vehicle from entering the segments 58 and 60.

Let it be assumed that the gate 92 occupies the solid line position shown in FIG. 1, whereby participant A has decided to allow the vehicle 20 to enter the segment 60. In this situation, and referring to FIG. 8, current flows from terminal 100 through the open gate light 280, normally closed contact 282, the normally closed open-gate pushbutton 284 and to common ground 146. The energized light 280 on A's control panel 44 provides a visual indication to A that he has left the gate which he controls on the other participant's board in its open condition. Assuming, however, that the participant A wishes to close the gate 92 and prevent the vehicle 20 from entering the segment 60 of his direct route 34, participant A depresses close gate pushbutton 286 which does the following. First, a circuit is completed from the point 100B in B's control panel 46 through a close light 288 on A's control panel to engage same. Simultaneously, a momentary circuit is completed through relay 290, conductors 292 and 294 and the momentarily depressed close gate pushbutton 286.

Energization of the relay 290 opens the normally closed contact 282, thereby deenergizing "open" light 280, and also closing the normally open contact 296 to provide a ground from the terminal 298. Additionally, when the normally closed contact 282 is moved to its 282' position, the coil 290 is locked in a circuit through the N.C. pushbutton 284 to ground. Thus, a parallel branch circuit may be permanently established from the terminal point 100B through the gate coil 300, and on to ground 146 through conductor 302. Energization of the gate coil 300 causes the gate 92 to pivot to the dotted line position shown in FIG. 1, whereby vehicle 20 would be prohibited from entering segment 60. Furthermore, once normally open contact 296 closes to provide a ground path for terminal 298, current flows from common conductor 1000 of FIG. 7 through the "A" gate counter 304 to record A's action when utilizing his gate. The meter portion of the gate counter 304 is schematically shown on the master control panel 56 of FIG. 6. The control of gate 90 by participant B would be identical in its operation and accordingly there is provided the gate counter 304B in the master control panel 56.

To open the gate, participant A would momentarily depress the open gate pushbutton 284, thereby interrupting current flow through the coil 290, causing the contact 282 to return to its normally closed position, which interrupts the current flow through the gate solenoid 300 to allow the gate 92 under the influence of suitable biasing means (not shown) to return to the solid line position shown in FIG. 1. Furthermore, the closed gate light 288 would become deenergized while the open gate light 280 would become energized.

While participant A is momentarily holding the open gate pushbutton 284 closed, current would flow from terminal 100 through open light 280 to the now open pushbutton 284 to ground. By the time the participant releases the open gate pushbutton 284, the normally closed contact 282 will have already returned to its normally closed position to continue the current path through the open light 280.

*Collision situation*

Let it be assumed that participants A and B have both selected their direct route 32 and 34, and furthermore that both participants have left their gates in the open position, such that the vehicles 18 and 20 enter the segments 58 and 60. Assuming that both parties have started at approximately the same time, then a collision situation will occur at approximately the midpoint of the segments 58 and 60. (If one participant had delayed, the collision could occur at a different location within the segment.)

In the collision situation, the extending conductive member 62 and 64 of FIGS. 1 and 2 engage one another to establish a circuit path between the two track layouts. Accordingly, as shown in FIG. 7, a circuit path would by completed from terminal 238B in the control apparatus 219B to the terminal 240 on A's control apparatus 219. Thus, a circuit is completed from positive potential at common conductor 1000 through collision coils 310, 312, conductors 314, diode 316, terminal 238B, conductor 318 (shown in phantom as representing conductive members 64 and 66 contacting one another), terminal 240, diode 320 and to ground at 322. With the energization of collision coils 310 and 312, normally open contact 324 is closed to perform the following operations. First, a current path is established from conductor 1000, through the contact 324, diode 326, conductor 328, terminal 330 (see FIG. 8), collision light 332 (see FIGS. 5 and 8), terminal 334 and (returning to FIG. 7) to ground at 336. Thus, a visual indication of the collision situation is entered on each control panel 44 and 46.

Simultaneously, negative pulses from the pulse generator 102 are applied to the "time of contact" counter 338 whose coil 340, in being pulsed, advances a meter designated 338 on the master control 56 of FIG. 6 to provide the experimenter with an accumulation of the time during which the participants are in the collision state.

Finally, the closing of contact 324 in response to energization of the collision coils 310 and 312 turns off transistor 342 to interrupt current flow in conductors 348 and 350 to thereby deenergize coils 246 and 246B which, as explained previously, will cause contacts 236 and 236B in the control apparatus 219 and 219B to open (under the influence of biasing means not shown). Therefore, even if the participants move their forward-reverse switches 246 and 246B to the forward designation, there will be no short circuit established between terminals 242 and 244, and 242B and 244B in the control apparatus such that forward motion of the vehicles after collision is prevented. However, either participant can reverse, since as explained previously, when the participant moves the forward-reverse switch 246 to the reverse designation, the reversing coil 258 and 258B are energized to close the normally open contact 232 and to change the position of the contacts 226 and 234 of the two-pole switches 227 and 227B, respectively, which will reverse polarity to the engines to effectuate reverse movement.

It will be appreciated, that electrical operation in the collision situation is identical whether the embodiments of FIGS. 2, 3 or 4 are being utilized.

When confronted with the collision situation the participants have several choices. For example, referring to FIG. 1, participant A might be willing to reverse his vehicle out of the segment 58 and allow participant B to complete his travel along the direct route 34 out of the segment 60. Then participant A could complete his travel on his direct route 32. Alternatively, a participant, say B, might be willing to reverse all the way back to his starting position 26, and select the alternate route 38, leaving A free to use the direct route. It will be appreciated that it is in the collision situation that the bargaining capabilities of the participants are most evident, and it will be also appreciated that each time a participant "gives in" in the collision situation by reversing out of his segment or reversing all the way to the start position and selecting the alternate route, the appropriate counters on the master control panel 56 of FIG. 6 will be pulsed to record the participant's action.

Assuming now that the participants have worked out a way to resolve their conflict, then the next thing to happen would be for one of the vehicles to reach its finish position. For example, if vehicle 18 of participant A reaches its finish position 24 the following will happen.

First, the forward limit microswitch 130 will be physically moved to its open position (see FIG. 8). Thus, there will no longer be a grounded path from terminal 252, such that participant A can no longer energize his reversing coil 258. Simultaneously, movement of the forward limit microswitch 130 to its open position will ground terminal 128 which, as may be seen in FIG. 7, will complete a first circuit path from the positive conductor 1000 through the "end A" light 124, diode 126 and conductor 127, thereby providing a visual indication on the master control panel 56 that participant A has completed his run. A second circuit path will be established from the transistor 342, through conductor 348, resistor 352, diode 358, conductor 127 and to ground through terminal 128 to short-out the coil 246 which will cause contact 236 in the control apparatus 219 to open, thereby preventing the operator from energizing his vehicle for forward motion.

Finally, current flowing from conductor 1000 through contact 99 in FIG. 7, will flow through resistor 96, diode 360, and conductor 127 and on to ground through the terminal 128 and the forward limit microswitch 130 to bypass the relay 97 which, when deenergized, will open the contact 99. The opening of contact 99 will stop the running time counter 104 and simultaneously interrupt the flow of current in terminal 100 (the main power source for participant A, see FIG. 8). The identical operation takes place when vehicle 20 reaches finishing portion 28.

Reset operation

Assuming both participants have concluded their runs, the experimenter may reset the entire apparatus by depressing reset switches 362 and 362B on the master control panel 56 of FIG. 6. Each reset switch is a four-pole switch which, when thrown, perfoms the following four functions. First, the normally closed contact 98 is moved to its open position to provide a circuit path from the conductor 1000 through the reset light 364 to ground. The reset light 364 is located on the master control panel 56 to provide the experimenter with indication that the reset operation is taking place. Second, normally open contact 366 is closed to establish a current path from the conductor 1000 through the reversing coil 258 and on to ground through the terminal 128 which, as noted previously, is ground through the now open forward limit microswitch 130. As pointed out previously, energization of the reversing coil 258 closes contact 232 and changes the position of contacts 226 and 234 in the control apparatus 219 to begin reverse motion of the vehicle 18. Third, a normally open contact 368 in the speed control 220 is closed to change the resistance of the rheostatic device such that the reverse speed of the vehicle during the resetting operation is greater than the normal forward and reverse speed during the experiment. Finally, the normally closed contact 154 is opened to prevent current flow from the step-down transformer 150 to the terminal 156 which, as was explained previously with respect to FIG. 8, was utilized to permit the participants to change routes. A similar operation takes place in B's control apparatus when the experimenter depresses the reset switch 262B.

When the vehicles reverse to their starting positions, forward limit microswitch 130 reverts back to its normally closed position, the rear limit microswitch 148 is physically returned to its open position, and once the experimenter has returned the reset switches 362 and 362B to their normal upward position on the control panel 56, the lights 264 and 264B will be extinguished, all reset switches 154, 98, 366, and 368 will revert to their normal positions and another run may be started by the experimenter momentarily depressing the start button 94, as previously explained.

It will be appreciated that the circuitry of FIGS. 7 and 8 constitutes a preferred embodiment of the instant ininvention and that other circuits are possible for accomplishing the same results. Regardless of the particular circuitry chosen, however, it is necessary for the success of the instant invention that the participants have a choice between a direct route and an alternate route; a choice of using or not using their gates (if a unilaterial or bilateral threat bargaining situation is desired); that there be provided means for simulating a collision in the event that both vehicles have selected their direct routes; and that there be means for the experimenter to record the various responses and actions of the participants during the experiment. However, it will be understood that the preferred embodiment described above does facilitate certain functions which are to be regarded as particularly advantageous features of the instant invention. Thus, the circuitry presented above does make possible the interlock arrangement whereby it is impossible for a participant to begin his forward progress until after a route has been selected. Similarly, once a participant, such as A, has progressed past the first switch and is travelling on either the direct or alternate route, he cannot switch his route until he has reversed back beyond the switch (in fact, all the way back to the starting point) thereby preventing a derailment of the vehicle which would otherwise occur if he reversed onto an open switch. Similarly, in the resetting operation, a derailment is prevented by not allowing the participants to change routes. Furthermore, the specific circuitry which allows a participant to reverse, but not go forward during a collision situation is a real-life simulation of two people traveling on a single track (or on a single lane highway).

Although there has been described a preferred embodiment of this novel invention, many variations and modifications will now be apparent to those skilled in the art. For example, within the scope of the instant invention it is contemplated that a third participant, other than the experimenter, could be provided with a control panel by which he could influence the outcome of the experiment. For insance, the third participant might be able to vary the speed of travel of the vehicles (by suitable control of the speed units 222 and 222B) or be able to defeat the selection of routes or use of gates by participants A and B (by suitable pushbutton contacts on the third participant's control panel). The addition of a third participant expands the psychological experiment in the sense that the third participant may "join forces" with either of the two participants, thereby facilitating the testing of the other participant in a bargaining situation where he is outnumbered and at a significant disadvantage. Therefore, this invention is to be limited, not by the specific disclosure herein, but only by the appending claims.

The embodiments of the invention in which an exclusive privilege or property is claimed are defined as follows.

1. A psychological bargaining game comprising:
  (A) first and second courses each including:
    (1) first and second termination points;
    (2) a first route connecting said first and second termination points for travel therebetween;
    (3) a second route longer than said first route connecting said first and second termination points for travel therebetween;
    (4) a vehicle movable between said first and second termination points on either said first and second routes;
    (5) switching means interposed between said first and second termination points for selecting which of said first and second routes said vehicle will travel between said first and second termination points; and
    (6) control means operable by a participant for controlling the movement of said vehicle and the operation of said switching means;
  (B) said vehicles of said first and second courses traveling toward a collision simulation location on their respective first routes when the participants of said first and second courses have directed their respective vehicles to travel their respective first routes between their respective first and second termination points; and
  (C) collision simulation means cooperating with said vehicles of said first and second courses for stopping forward movement of the vehicles of said first and second courses when said respective vehicles arrive at their respective collision simulation locations.

2. The psychological bargaining game of claim 1, and further including:
  (D) first gate means on said second course selectively operable by the participant of said first course between a first and second condition for permitting and preventing, respectively, said vehicle of said second course from reaching its respective collision simulation location.

3. The psychological bargaining game of claim 2, and further including:
  (E) second gate means on said first course selectively operable by the participant of said second course between a first and second condition for permitting and preventing, respectively, said vehicle of said first course from reaching its respective collision simulation location.

4. The psychological bargaining game of claim 3, and further including:
  (F) monitoring means responsive to the operation of said control means and said first second gate means by the participants of said first and second courses for providing an indication thereof.

5. The psychological bargaining game of claim 1, wherein each of said first routes of said first and second courses has a predetermined segment, said collision simulation locations of said respective first routes falling within the respective predetermined segments and being variably located therein dependent upon the time of arrival of the respective vehicles in their respective predetermined segments when the vehicle of said first and second courses are both traveling on their respective first routes between their respective first and second termination points.

6. The psychological bargaining game of claim 5, wherein the vehicles of said first and second courses are electrically operated in a forward direction by the application of electrical current of a first polarity thereto, and electrically operated in a reverse direction by the application of electrical current of a second polarity thereto, and said collision simulation means includes cooperating circuit completion means associated with each vehicle for preventing the application fo the current of said first polarity to said vehicles when said vehicles reach their respective collision simulation locations within their respective segments.

7. The psychological bargaining game of claim 6, wherein each of said circuit completion means associated with each of said vehicles includes a current-carrying member carried by the respective vehicle, said current-carrying members engaging one another to complete an electrical circuit which prevents the application of the current of said first polarity to their respective vehicles when said vehicles arrive at their collision simulation locations.

8. The psychological bargining game of claim 6, and further including a plurality of insulatingly spaced conductive members disposed between said first routes of said first and second courses along said respective predetermined segments, and wherein each of said circuit completion means associated with each of said vehicles includes a current-carrying member carried by the respective vehicle, said current-carrying members engaging a common conductive member to complete an electrical circuit which prevents the application of the currents of said first polarity to the respective vehicles when said vehicles arrive at their collision simulation locations.

9. The psychological bargaining game of claim 6, and further including first and second pluralities of insulatingly spaced conductive members disposed along said predetermined segments of said first routes of said first and second courses, respectively; corresponding ones of said conductive members of said first and second plurality of conductive members being electrically connected to one another; and wherein each of said circuit completion means associated with each of said vehicles includes a current-carrying member carried by the respective vehicle, said current-carrying members engaging corresponding ones of said first and second pluralities of conductive members to complete an electrical circuit which prevents the application of the currents of said first plurality to the respective vehicle when said vehicles arrive at their collision simulation locations.

10. The psychological bargaining game of claim 6, wherein said predetermined segments of said first routes of said first and second courses are parallel to one another; said vehicles of said first and second courses travel in opposite directions along their respective segments when the participants of said first and second courses have directed their respective vehicles to travel their first routes; and said circuit completion means associated with each vehicle cooperate with one another to prevent the application of the currents of said first polarity to the respective vehicles when said respective vehicles approach locations within their predetermined segments, which if joined would define a line mutually perpendicular to both segments.

11. The psychological bargaining game of claim 1, and further including interlocking circuit means cooperating with said control means for preventing the participants of said first and second courses from controlling the movement of the respective vehicles until the respective participant has selected one of said first and second routes by the operation of said switching means.

12. The psychological bargaining game of claim 1, and further including limit switch means located at the first termination points of said first and second courses and operable by the physical presence and absence of the respective vehicles at said first termination points for preventing the operation of the respective switching means unless the respective vehicle is situated at said respective first termination point.

13. The psychological bargaining game of claim 1, wherein the switching means of each course includes a three-state logic circuit including first and second normally "on" switching elements, a first normally open first route contact; a second normally open second route contact; a first route switching coil connected in parallel with said first route contact; a second route switching coil connected in parallel with said second route contact; a first shorting path interconnecting said first route contact with said second normally "on" switching element; a second shorting path interconnecting said second route contact and said first normally "on" switching element; a first relay in series with said first route contact and said first switching element, said first relay having a normally open contact which when closed provides a grounded path for a first predetermined terminal; a second relay in series with said second route contact and said second switching element, said second relay having a normally open contact which when closed provides a grounded path for said first predetermined terminal; closing of said first route contact energizing said first route switching coil to set the respective course for vehicle travel along said first route; shorting out said second switching element; and energizing said first relay to close its normally open contact to provide a grounded path for said first predetermined terminal; closing of said second route contact energizing said second route switching coil to set the respective course for vehicle travel along said second route; shorting out said first switching element; and energize said second relay to close its normally open contact to provide a grounded path for said first predetermined terminal.

14. The psychological bargaining game of claim 13, wherein each of said courses further includes a normally closed rear limit switch at its respective first termination points, said normally closed rear limit switch being in electrical series with both said first and second route contacts and being maintained in an open condition to complete a circuit from said route contacts to ground whenever said vehicles are situated at their respective first termination points, whereby the closing of one of said route contacts to effectuate route selection will only be effective when the respective vehicles are situated at their respective first termination points.

15. The psychological bargaining game of claim 13, wherein said control means of each course includes a source; terminal means connected to the respective course; a forward-reverse switch; polarity switching means connected between said source and said terminal means for applying current of a forward-motion-producing polarity to said terminal means in response to movement of said forward-reverse switch in a first direction and for applying current of a rearward-motion-producing polarity to said terminal means in response to movement of said forward-reverse switch in a second direction; a normally open enabling contact which when closed allows said current of said forward-motion-producing polarity to be applied to said terminal means in response to movement of said forward-reverse switch in its first direction; and an enabling relay energizable to close said enabling contact when said predetermined terminal is grounded; whereby said vehicles are prohibited from forward movement until one of said first and second routes are sleeeted.

16. The psychological bargaining game of claim 1, and further including first gate means on said second course selectively operable by the participant of said first course between a first and second condition for permitting and preventing, respectively, said vehicle of said second course from reaching its respective second termination point.

17. The psychological bargaining game of claim 16, and further including second gate means on said first course selectively operable by the participant of said second course between a first and second condition for permitting and preventing, respectively, said vehicle of said first course from reaching its respective second termination point.

References Cited

UNITED STATES PATENTS 2,806,323  9/1957  OBACK __________ 35—11 X

FOREIGN PATENTS 1,035,544  4/1953  France.
921,118  3/1963  Great Britain.

EUGENE R. CAPOZIO, *Primary Examiner.*

W. H. GRIEB, *Assistant Examiner.*

U.S. Cl. X.R.

273—131